(12) United States Patent
Kim

(10) Patent No.: US 8,085,843 B2
(45) Date of Patent: Dec. 27, 2011

(54) MP4 DEMULTIPLEXER AND METHOD OF OPERATING THE SAME

(75) Inventor: Tae Wook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1064 days.

(21) Appl. No.: 11/945,816

(22) Filed: Nov. 27, 2007

(65) Prior Publication Data

US 2008/0165847 A1    Jul. 10, 2008

(30) Foreign Application Priority Data

Jan. 5, 2007 (KR) .................. 10-2007-0001252

(51) Int. Cl.
*H04N 11/02* (2006.01)

(52) U.S. Cl. .................................. 375/240.12

(58) Field of Classification Search ................. None
See application file for complete search history.

(56) References Cited

U.S. PATENT DOCUMENTS

2002/0168175 A1* 11/2002 Green et al. .................... 386/68
2003/0188182 A1* 10/2003 Sato et al. .................... 713/193

* cited by examiner

*Primary Examiner* — Yong Zhou
(74) *Attorney, Agent, or Firm* — Birch, Stewart, Kolasch & Birch, LLP

(57) ABSTRACT

Provided are an MP4 demultiplexer and a method of operating the same, enabling an MP4 file to be played in a fast-play mode input by a user, wherein the MP4 demultiplexer extracts all intra-frames (I-frames) among video frames in a sample track of an MP4 file, and the MP4 demultiplexer extracts predicted-frames (P-frames) by skipping, according to a fast-play speed input by a user, at least one P-frame in a succession of P-frames present between the I-frames.

5 Claims, 4 Drawing Sheets

MP4 DEMULTIPLEXER AND METHOD OF OPERATING THE SAME

CROSS-REFERENCE TO RELATED APPLICATION

This application claims the benefit of Korean Patent Application No. 10-2007-0001252, filed on Jan. 5, 2007, which is hereby incorporated by reference in its entirety.

BACKGROUND OF THE INVENTION

1. Field of the Invention

The present invention relates to an MPEG-4 Part 14 (MP4) demultiplexer and a method of operating the same, and more particularly, to an MP4 demultiplexer and a method of operating the same, enabling an MP4 file to be played in a fast-play mode inputted by a user.

2. Description of the Related Art

Recently, as a multimedia container format standard for multiplexing and compressing multimedia contents (such as digital video, audio, subtitles and still images), MP4 has been receiving much attention. MP4 is being widely used as a container file format for digital video files encoded by the MPEG-4 standard and digital still images encoded by the next-generation JPEG 2000 standard.

MP4 is based on Apple's Quicktime container format and is used internationally as the file format for the Third Generation Partnership Project (3GPP/3GPP2) and as the standard file format for VOD files by telecommunication service providers in Korea. As such, MP4 is being widely used in wireless telecommunication networks.

In mobile communication devices, multimedia content is now stored and transmitted in the MP4 file format. Correspondingly, multimedia content provided by content service providers and telecommunication service providers are also in the MP4 file format.

Accordingly, mobile communication devices such as mobile phones are provided with functions for playing multimedia content in MP4 file format in which one of these functions enables users to play the multimedia content at a desired position during a play mode.

However, since the mobile communication devices in general have limited processing capabilities, multimedia content in MP4 file format cannot be decoded fast enough to play the multimedia content in a fast-play mode.

Specifically, most mobile communication devices can only decode 15 frames per second for an image having a size of 176×144 pixels, in contrast to a conventional personal computer which has enough processing capability to decode "avi" and "asf" files to enable a fast play of 2× to 4×. Therefore, in view of the processing capability and power consumption of the mobile communication devices, it is difficult to realize in the mobile communication devices the fast decoding conventionally provided by personal computers.

Further, when the mobile communication devices are used for various purposes such as language studies which often require multimedia content to be played in replay and fast-play modes, such functions cannot be provided due to the slow decoding capabilities of the mobile communication devices.

SUMMARY OF THE INVENTION

Accordingly, the present invention is directed to an MPEG-4 Part 14 (MP4) demultiplexer and a method of operating the same that substantially obviates one or more problems due to limitations and disadvantages of the related art.

Aspects of the present invention provide an MP4 demultiplexer and a method of operating the same, which can enable an MP4 file to be played in a fast-play mode input by a user.

Additional advantages, aspects, and features of the invention will be set forth in part in the description which follows and in part will become apparent to those having ordinary skill in the art upon examination of the following or may be learned from practice of the invention.

According to an aspect of the present invention, there is provided an MP4 demultiplexer including: a frame-position calculating unit selecting frames to be extracted among video frames of an MP4 file, according to information of a speed at which the MP4 file is to be played, and calculating respective positions of the selected frames based on an address of a start frame of the MP4 file; and a frame extracting unit extracting the selected frames from the MP4 file based on the calculated positions of the selected frames and respective frame-size information of the selected frames.

The MP4 demultiplexer may further include a memory having stored with an "stco" box storing the address of the start frame of the MP4 file, an "stss" box storing respective frame numbers corresponding to intra-frames (I-frames) of the video frames, and an "stsz" box storing respective frame-size information of the video frames.

The MP4 demultiplexer may further include a frame-size extracting unit which extracts from the stsz box stored the memory the respective frame-size information of the frames selected by the frame-position calculating unit, in which the frame extracting unit extracts the selected frames based on the extracted frame-size information of the selected frames.

The frame-position calculating unit may determine a number of predicted-frames (P-frames) to be extracted by a determining a number of P-frames present between the I-frames based on the I-frame numbers stored in the stss box, according to the information of the speed at which the MP4 file is to be played, select P-frames to be extracted according to the number of P-frames determined to be extracted, and calculate respective positions of the selected P-frames by using the start-frame address information stored in the stco box and the video-frame size information stored in the stsz box.

The frame-position calculating unit may select the P-frames by skipping at least one P-frame in a succession of P-frames, when selecting the P-frames to be extracted.

According to another aspect of the present invention, there is provided a method of operating an MP4 demultiplexer, the method including: selecting frames to be extracted among video frames of an MP4 file, according to information of a speed at which the MP4 file is to be played; calculating respective positions of the selected frames by using an address of a start frame of the MP4 file and respective frame-size information of the video frames; and extracting the selected frames from the MP4 file by using information of the calculated positions of the selected frames and respective frame-size information of the selected frames.

The selecting of the frames to be extracted may be performed by determining a number of P-frames to be extracted by a determining a number of P-frames present between intra-frames (I-frames) using corresponding I-frame numbers stored in the MP4 file, and selecting P-frames to be extracted according to the number of P-frames determined to be extracted.

The calculating of the respective positions of the selected frames may be performed by adding respective sizes of the video frames to the address of the start frame of the MP4 file.

The selecting of the frames to be extracted may be performed by selecting all intra-frames (I-frames) of the MP4 file as the frames to be extracted, and selecting P-frames as the frames to be extracted by skipping at least one P-frame in a succession of P-frames present between the I-frames.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION OF THE EXEMPLARY EMBODIMENTS

Figure 1:
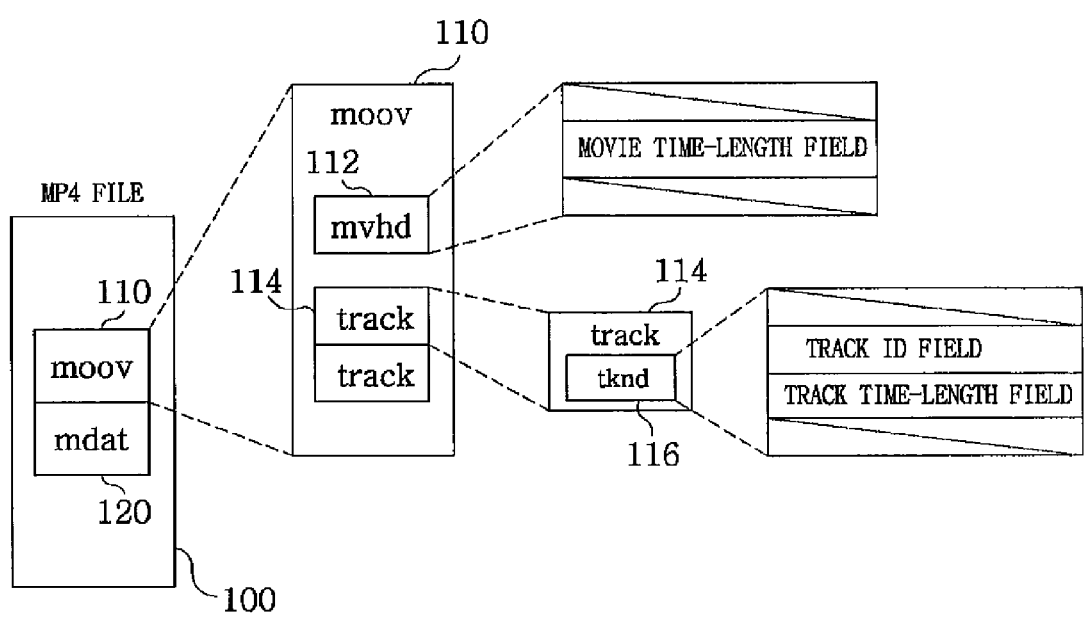
FIG. 1 illustrates the data format of an MP4 file.

Reference will now be made in detail to the exemplary embodiments of the present invention, examples of which are illustrated in the accompanying drawings. The invention may, however, be embodied in many different forms and should not be construed as being limited to the embodiments set forth herein. Rather, these embodiments are provided so that this disclosure will be thorough and complete, and will fully convey the concept of the invention to those skilled in the art. Wherever possible, the same reference numerals will be used throughout the drawings to refer to the same or like parts.

FIG. 1 illustrates the data format of an MPEG-4 Part 14 (MP4) file.

As shown in FIG. 1, an MP4 file 100 is a container file format which includes an "mdat" box 120 (hereinafter referred to as "mdat") containing a multiplexed content and a "movie" box 110 (hereinafter referred to as "moov") containing description information about the content in the mdat 120.

The moov 110 includes one movie header box 112 (hereinafter referred to as "mvhd") and a plurality of track boxes 114. Here, the mvhd 112 includes a movie time-length field which indicates a standard playtime length of the content in the mdat 120.

Each of the track boxes 114 includes a track header box 116 (hereinafter referred to as "tkhd") which has a track ID field including identifier information for distinguishing a corresponding track. Each of the track box 114 also includes a track time-length field for indicating a standard playtime length of the corresponding track, which is displayed through the identifier information included in the track ID field.

Additionally, each of the track boxes 114 further includes a video description track and an audio description track respectively including video information and audio information.

The mdat 120 includes a video sample track and an audio sample track respectively having stored with a video content and an audio content in units of frame.

Figure 2A:
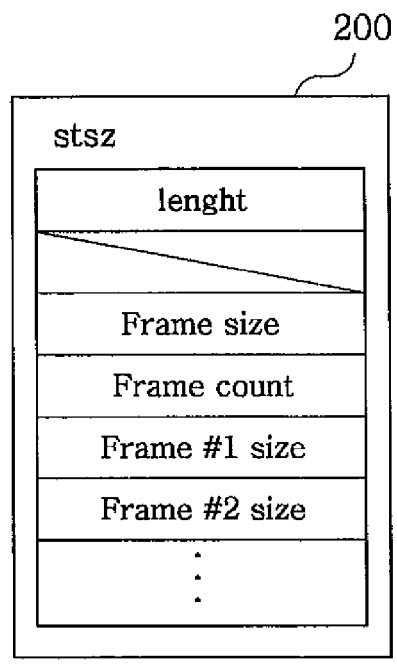
FIGS. 2A and 2B respectively illustrate the respective data formats of an "stsz" box and an "stss" box used in the present invention.
Figure 2B:
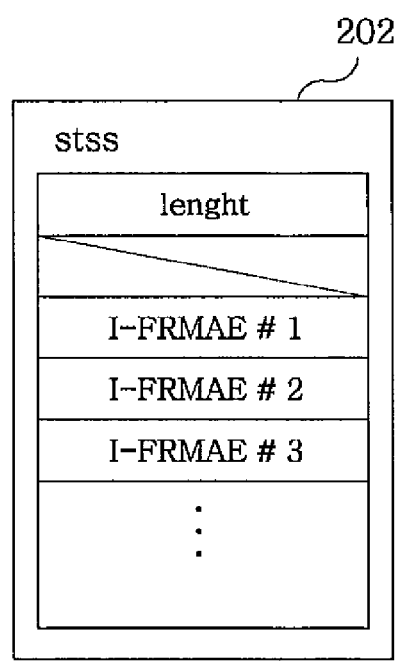

FIGS. 2A and 2B respectively illustrate the respective data formats of an "stsz" (sample size atom by frame) box and an "stss" (time to sample atom) box used in the present invention.

An stsz box 200 and an stss box 202 are stored with information to used with an "stco" box for searching locations of the video and audio contents stored in the mdat 120 of the MP4 file 100.

The stsz box 200, the stss box 202, and the stco box are included in the video description track and the audio description track of the moov 100. Information included in the stsz box 200 (hereinafter referred to as "stsz information") and information included in stss box 202 (hereinafter referred to as "stss information") will be described in detail by referring to FIGS. 2A and 2B.

As shown in FIG. 2A, the stsz box 200 includes a field having its own length information, a field having frame-size information of frames included in a corresponding video sample track or a corresponding audio sample track, a field having information of a total number of frames, and a field having frame-size information of each frame, the frame size information being sequentially stored according to frame numbers.

The frame-size information, the information of the total number of frames, and the frame-size information of each video frame and each audio frame included in the video sample track and the audio sample track of the mdat 120 can be obtained through the stsz information.

The stco box, which is included in the video description track and the audio description track along with stsz box 200, contains address information of a start frame of a corresponding track having stored with the video or audio frames.

Accordingly, through information included in the stco box (hereinafter referred to as "stco" information), an address of the start frame of the corresponding track having stored with the video or audio frames can be obtained. Then, referring to the stsz information for the frame-size information of each frame, a start address of each frame in the track can be sequentially calculated from the address of the start frame.

Here, in the stsz box 200, the size of a field storing the frame-size information of each frame is 4 bytes. Accordingly, the frame-size information of each frame can be sequentially obtained by an offset of 4 bytes.

FIG. 2B illustrate the data format of the stss box 202. As shown, the stss box 202 includes a field having its own length information and a field having stored with frame numbers designating intra-frames (I-frames) in the video sample track.

Accordingly, the frame number of the I-frames in the video sample track can be obtained through the stss information.

When decoding video content in the MP4 file 100, a proper decoding of a group of video (GOV) can be initiated by decoding from an I-frame corresponding to the first I-frame number obtained through the stss information.

Here, in the stss box 202, the size of a field storing the frame number of each I-frame is 4 bytes. Accordingly, the frame number of each I-frame can be sequentially obtained by an offset of 4 bytes.

Figure 3:
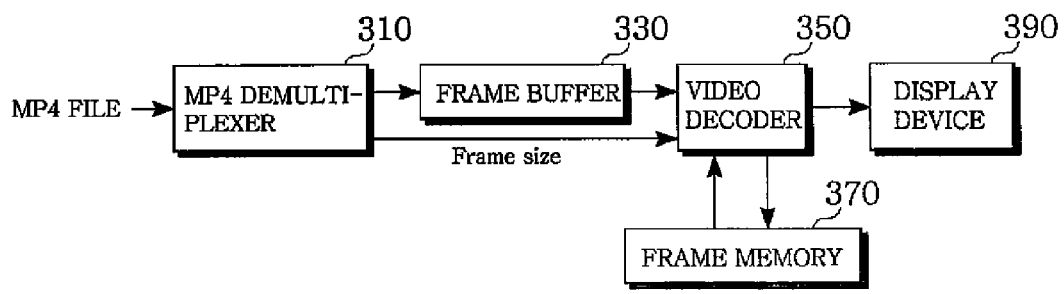
FIG. 3 illustrates the structure of an MP4 system having implemented with an MP4 demultiplexer of the present invention.

FIG. 3 illustrates the structure of an MP4 system having implemented with an MP4 demultiplexer of the present invention.

As shown in FIG. 3, the MP4 system includes an MP4 demultiplexer 310, a frame buffer 330, a video decoder 350, a frame memory 370, and a display device 390.

The MP4 demultiplexer 310 receives an MP4 file and extracts and outputs video frames of the MP4 file and frame-size information of the video frames.

The frame buffer 330 receives and buffers the video frames output from the MP4 demultiplexer.

The video decoder 350 decodes the video frames buffered by the frame buffer 330 based on the frame-size information of the video frames output from the MP4 demultiplexer, and outputs video signals.

The frame memory 370 stores video I-frames output from the MP4 demultiplexer by the control of the video decoder 350 and provides the I-frames required for decoding the video frames to the video decoder 350.

The display device 390 receives the video signals output from the video decoder 350 and displays a corresponding video content of the MP4 file.

As described above, the MP4 demultiplexer 310 extracts and outputs the video frames from the input MP4 file. The extracted video frames are then buffered and output by the frame buffer 330 to the video decoder 350 which decodes the buffered video frames and outputs video signals to the display device 390 to display the corresponding video content.

Figure 4:
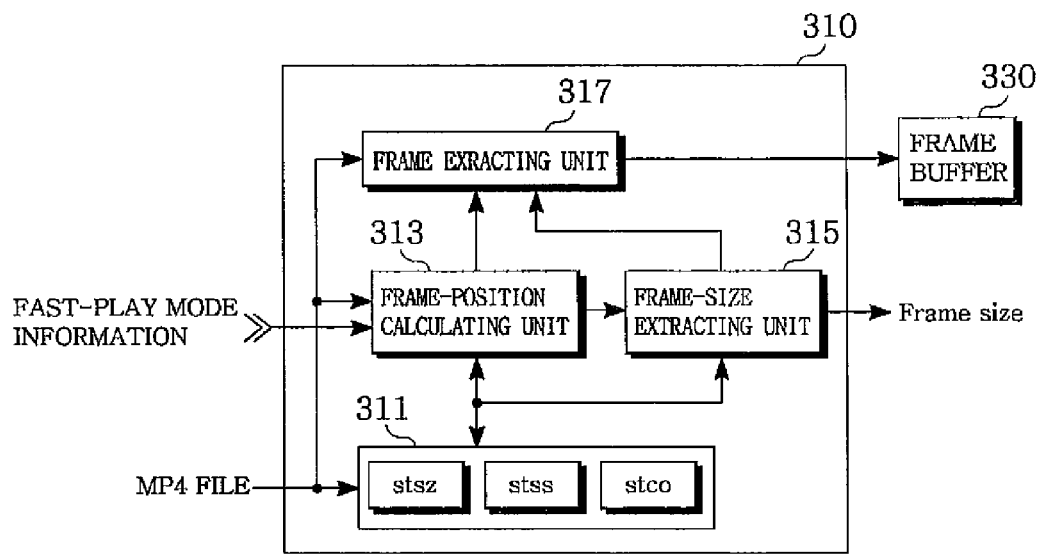
FIG. 4 illustrates the structure of an MP4 demultiplexer according to an exemplary embodiment of the present invention.

FIG. 4 illustrates the structure of an MP4 demultiplexer according to an exemplary embodiment of the present invention. When the MP4 demultiplexer of the present invention is implemented in the MP4 system shown in FIG. 3, the MP4 demultiplexer enables the MP4 system to play MP4 files in a fast-play mode.

An MP4 demultiplexer 310 of the present invention includes a memory 311, a frame-position calculating unit 313, a frame-size extracting unit 315, and a frame extracting unit 317, which are all controlled by a controller (not shown).

Herein below, an operation of the MP4 demultiplexer 310 will be described in detail.

By the control of the controller, the memory 311 stores the stsz information and the stss information included in the video description track of the MP4 file input into the MP4e demultiplexer. The stsz information, stss information, and stco information have already been described in detail by referring to FIGS. 2A and 2B.

The frame-position calculating unit 313 searches in the stss information stored in the memory 311 the frame numbers of the I-frames included the video sample track, and selects, according to a play speed input by a user, predicted-frames (P-frames) present between the I-frames to be extracted.

By referring to FIG. 5, a method of selecting P-frames by the frame-position calculating unit 313, according to the play speed input by the user, will be described in detail.

Figure 5:
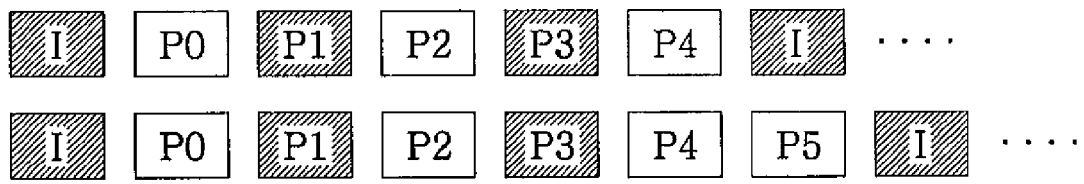
FIG. 5 illustrates a method by which the MP4 demultiplexer shown in FIG. 4 selects and extracts video frames of an MP4 file to be played in a fast-play mode, according to another exemplary embodiment of the present invention.

FIG. 5 illustrates a method by which the MP4 demultiplexer shown in FIG. 4 selects and extracts video frames of an MP4 file to be played in a fast-play mode, according to another exemplary embodiment of the present invention. Here, the fast-play mode input by the user is 2×.

As shown, in order to play the MP4 file in the 2× fast-play mode. The MP4 demultiplexer 310 extracts all I-frames among the video frames in the video sample track, and then selects and extracts every other P-frame present between the I-frames.

Here, although the MP4 demultiplexer 310 extracts all I-frames among the video frames in the video sample track, the P-frames are selected and extracted by skipping at least one P-frames present between the I-frames according to the fast-play mode input by the user.

That is, when the fast-play mode is 2×, the MP4 demultiplexer 310 selects and extracts the P-frames present between the I-frames by skipping one P-frame. When the fast-play mode is 3×, the MP4 demultiplexer 310 selects and extracts the P-frames present between the I-frames by skipping two P-frames.

As shown in the lower portion of FIG. 5, in the method of selecting and extracting the video frames of the MP4 file to be played in the 2× fast-play mode, every other P-frame after the I-frame is selected and extracted. However, if the next P-frame to be selected and extracted is one before the next I-frame, this P-frame is skipped. Here, to enable the MP4 file to be played in a fast-play mode takes priority over the picture quality of the MP4 file.

Referring to FIG. 5, the frame-position calculating unit 313 of the MP4 demultiplexer 310 select the video frames to be extracted according to the fast-play mode input by the user, and checks an address of a start frame (I-frame) of the video sample track through the stco information.

The frame-position calculating unit 313 checks the stsz information stored in the memory 311 for the frame size of each video frame, and then calculates and outputs respective positions of the selected frames by adding the frame size of each video frame to the address of the start frame of the MP4 file.

The frame-size extracting unit 315 extracts from stsz information stored in the memory 311 frame-size information corresponding to the video frames selected by the frame-position calculating unit 313, and then outputs the frame-size information.

The extracting unit 317 receives the calculated positions of the selected frames from the frame-position calculating unit 313 and frame-size information corresponding to the selected frames from the frame-size extracting unit 315, and then extracts and outputs corresponding video frames of the MP4 file.

As described above, the MP4 demultiplexer 310 of the present invention selects and extracts the video frames of the MP4 file according to the fast-play mode input by the user, and provides the extracted video frames to the video decoder 350. As a result, when the MP4 file is to be played in the fast-play mode input by the user, the MP4 demultiplexer 310 of the present invention provides an effect similar to fast decoding of the MP4 file.

Figure 6:
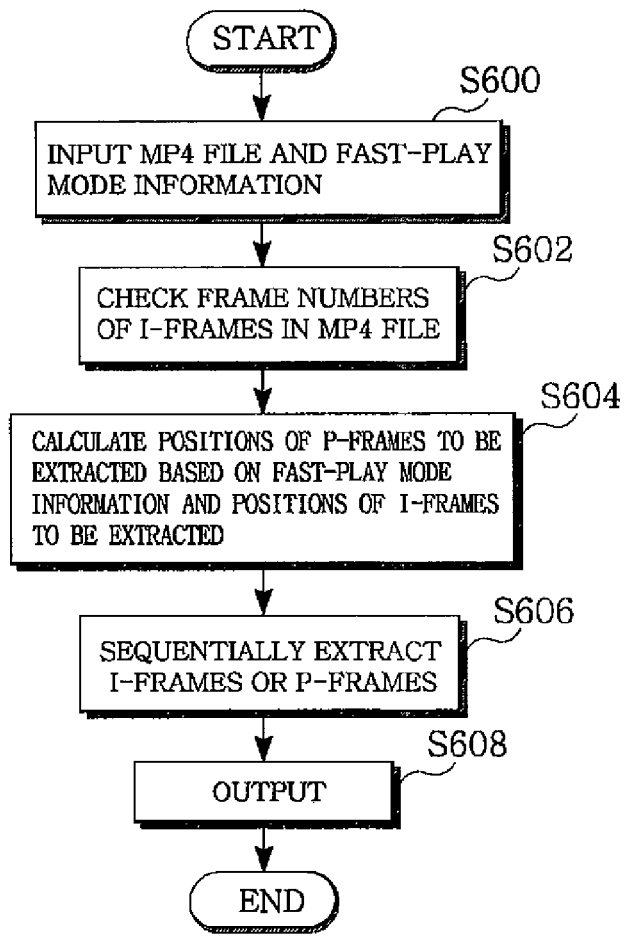
FIG. 6 is a flow chart illustrating an operation of the MP4 demultiplexer shown in FIG. 4.

FIG. 6 is a flow chart illustrating an operation of the MP4 demultiplexer shown in FIG. 4. As shown, the MP4 demultiplexer 310 receives a fast-play mode information input by a user in order to play an MP4 file input thereto in the fast-play mode (S600).

The MP4 demultiplexer 310 checks the frame numbers corresponding to the I-frames included in the MP4 file (S602), selects all I-frames as the frames to be extracted, selects the P-frames as the frames to be extracted by skipping at least one P-frame in a series of P-frames present between the I-frames according to the fast-play mode information input by the user, and calculates the respective positions of the I-frames and the P-frames in the MP4 file (S604).

Here, the MP4 demultiplexer 310 calculates the positions of the I-frames and the P-frames to be extracted from the MP4 file by using the stsz, stss, and stco information included in the video description track of the MP4 file, as already described earlier.

That is, by referring to the stss information for the frame numbers of the I-frames, the MP4 demultiplexer 310 determines the number of P-frames to be extracted by determining the number of P-frames present between the I-frames, selects the P-frames according to the determined number of P-frames to be extracted, and calculates the respective positions of the I-frames and the selected P-frames to be extracted by using the start frame address stored in the stco box and the frame-size information stored in the stsz box.

In other words, when selecting the P-frames to be extracted, the MP4 demultiplexer selects the P-frames by skipping at least one P-frame in a series of P-frames present between the I-frames, according to the fast-play mode input by the user.

Then, the MP4 demultiplexer 310 sequentially extracts and outputs the I-frames or the P-frames located at the calculated positions to the video decoder 350, along with the frame-size information (S606 and S608).

Accordingly, instead of outputting all video frames in an MP4 file, the MP4 demultiplexer according to the present invention selectively outputs to a decoder all I-frames and P-frames selected according to a fast-play mode input by a user to enable the MP4 file to be played in the fast-play mode.

Specifically, although the MP4 demultiplexer according to the present invention extracts all I-frames in the video sample track of an MP4 file, the P-frames are selected and extracted by skipping at least one P-frames present between the I-frames according to the fast-play mode input by the user.

As a result, the MP4 demultiplexer of the present invention may overcome the limited processing capabilities of mobile communication devices to enable MP4 files to be played in various fast-play modes desired by a user in such mobile communication devices.

Although the invention has been described with reference to an exemplary embodiment, it is understood that the words that have been used are words of description and illustration, rather than words of limitation. As the present invention may be embodied in several forms without departing from the spirit or essential characteristics thereof it should also be understood that the above-described embodiment is not limited by any of the details of the foregoing description, unless otherwise specified. Rather, the above-described embodiment should be construed broadly within the spirit and scope of the present invention as defined in the appended claims. Therefore, changes may be made within the metes and bounds of the appended claims, as presently stated and as amended, without departing from the scope and spirit of the invention in its aspects.

What is claimed is:

1. An MPEG-4 Part 14 (MP4) demultiplexer comprising:
a frame-position calculating unit configured to select frames to be extracted among video frames of an MP4 file, according to information of a speed at which the MP4 file is to be played, and to calculate respective positions of the selected frames based on an address of a start frame of the MP4 file;
a frame extracting unit configured to extract the selected frames from the MP4 file based on the calculated positions of the selected frames and respective frame-size information of the selected frames; and
a memory including a stco box configured to store the address of the start frame of the MP4 file, a stss box configured to store respective frame numbers corresponding to intra-frames (I-frames) of the video frames, and a stsz box configured to store respective frame-size information of the video frames,
wherein the frame-position calculating unit determines a number of predicted-frames (P-frames) to be extracted by determining a number of P-frames present between the I-frames based on a number of the I-frames stored in the stss box, according to the information of the speed at which the MP4 file is to be played, selects P-frames to be extracted according to the number of P-frames determined to be extracted, and calculates respective positions of the selected P-frames by using information of the start-frame address stored in the stco box and the frame-size information of the video frames stored in the stsz box, and
the frame-position calculating unit selects the P-frames by skipping at least one P-frame in a succession of P-frames, when selecting the P-frames to be extracted.

2. The MP4 demultiplexer of claim 1, further comprising:
a frame-size extracting unit configured to extract from the stsz box stored the memory the respective frame-size information of the frames selected by the frame-position calculating unit,
wherein the frame extracting unit extracts the selected frames based on the extracted frame-size information of the selected frames.

3. A method of operating an MP4 demultiplexer including a memory, the method comprising:
selecting, by the MP4 demultiplexer, frames to be extracted among video frames of an MP4 file, according to information of a speed at which the MP4 file is to be played;
calculating respective positions of the selected frames by using an address of a start frame of the MP4 file and respective frame-size information of the video frames;
extracting the selected frames from the MP4 file by using information of the calculated positions of the selected frames and respective frame-size information of the selected frames; and
storing the address of the start frame of the MP4 file in a stco box of the memory, storing respective frame numbers corresponding to intra-frames (I-frames) of the video frames in a stss box of the memory, and storing respective frame-size information of the video frames in a stsz box of the memory,
wherein a number of predicted-frames (P-frames) to be extracted is determined by determining a number of P-frames present between the I-frames based on a number of the I-frames stored in the stss box, according to the information of the speed at which the MP4 file is to be played, P-frames to be extracted is selected according to the number of P-frames determined to be extracted, and respective positions of the selected P-frames are calculated by using information of the start-frame address stored in the stco box and the frame-size information of the video frames stored in the stsz box, and
the P-frames is selected by skipping at least one P-frame in a succession of P-frames, when selecting the P-frames to be extracted.

4. The method of claim 3, wherein the calculating of the respective positions of the selected frames is performed by adding respective sizes of the video frames to the address of the start frame of the MP4 file.

5. The method of claim 3, wherein the selecting of the frames to be extracted is performed by selecting all I-frames of the MP4 file as the frames to be extracted, and selecting P-frames as the frames to be extracted by skipping at least one P-frame in a succession of P-frames present between the I-frames.

* * * * *